US006840333B2

(12) United States Patent
Rieke

(10) Patent No.: US 6,840,333 B2
(45) Date of Patent: Jan. 11, 2005

(54) MULTI-FUNCTION IMPLEMENT FOR ATTACHMENT TO A TRACTOR AND THE LIKE

(76) Inventor: Todd Rieke, 21 Hawthorne Rd., Barrington, IL (US) 60010

(*) Notice: Subject to any disclaimer, the term of this patent is extended or adjusted under 35 U.S.C. 154(b) by 0 days.

(21) Appl. No.: 10/159,869

(22) Filed: May 31, 2002

(65) Prior Publication Data

US 2003/0221846 A1 Dec. 4, 2003

(51) Int. Cl.[7] .............................................. A01B 51/043
(52) U.S. Cl. ..................... 172/443; 172/445.1; 172/677; 172/684.5
(58) Field of Search ............................... 172/684.5, 762, 172/763, 773–775, 677–680, 271, 439, 443, 445.1, 768, 699, 700; 37/347, 366, 367, 379, 380, 370

(56) References Cited

U.S. PATENT DOCUMENTS

| 5,195,597 | A | * | 3/1993 | Yeomans | ..................... 172/271 |
| 5,431,232 | A | * | 7/1995 | Kirsch | ......................... 172/438 |
| 5,560,130 | A | * | 10/1996 | Bapst | ...................... 172/271 X |
| 6,382,873 | B1 | * | 5/2002 | Mulders et al. | ...... 172/684.5 X |

FOREIGN PATENT DOCUMENTS

| GB | 2139066 A | * | 11/1984 |
| GB | 2236283 A | * | 4/1991 |
| WO | WO-87/03774 A1 | * | 7/1987 |

* cited by examiner

Primary Examiner—Christopher J. Novosad
(74) Attorney, Agent, or Firm—Barnes & Thornburg LLP

(57) ABSTRACT

A multi-function implement for attachment to a tractor or the like for trenching, cutting, burying cable, and similar functions. The implement has a universal frame with a tractor attachment portion and a tool attachment portion. A series of tools are individually connectable to the universal frame, with each tool having a frame attachment portion which is complementary to the tool attachment portion of the universal frame. The tools are selectively connectable to the universal frame with the frame attachment portion of the tool joining the tool attachment portion of the universal frame. Each of the tools is individually formed to perform a particular function, such as cutting a trench, burying a cable, or removing a swath of sod.

11 Claims, 6 Drawing Sheets

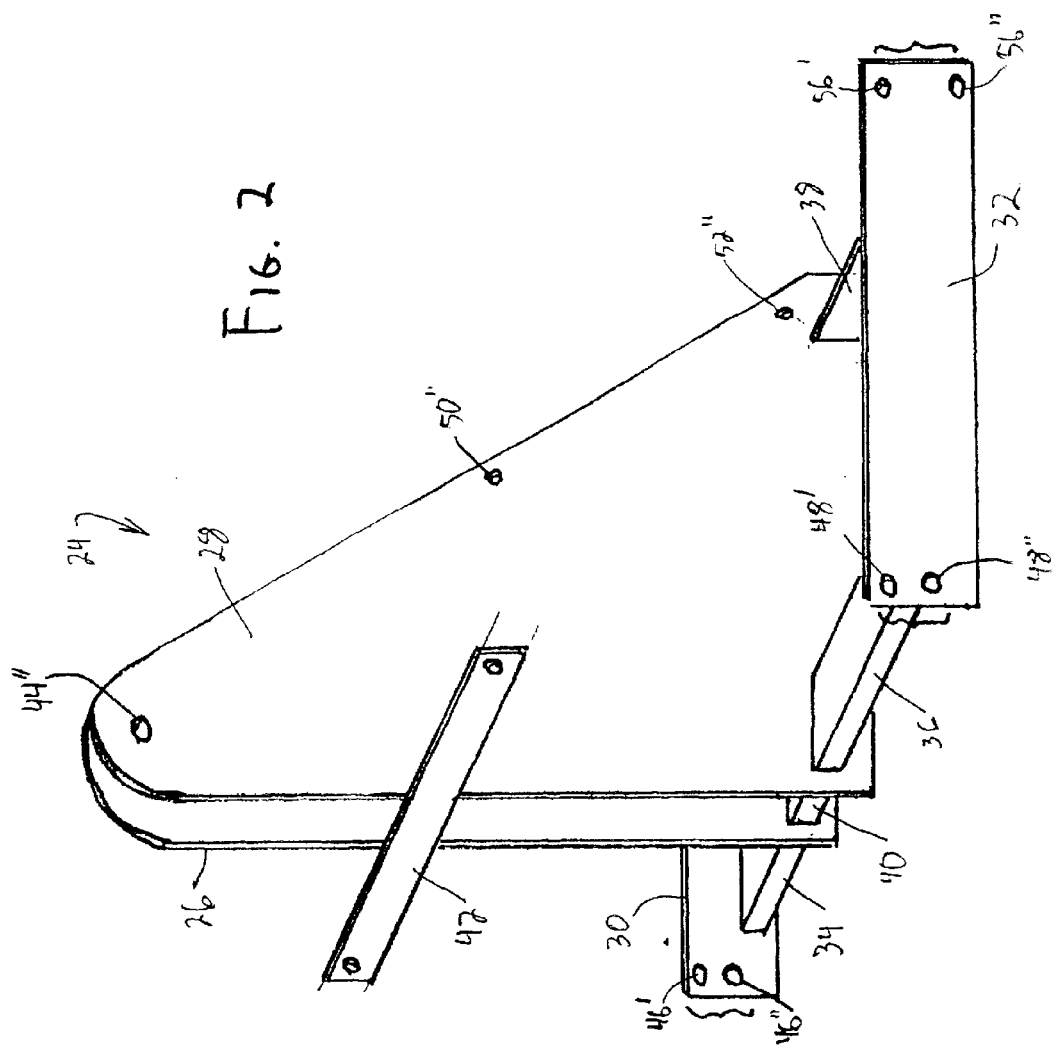

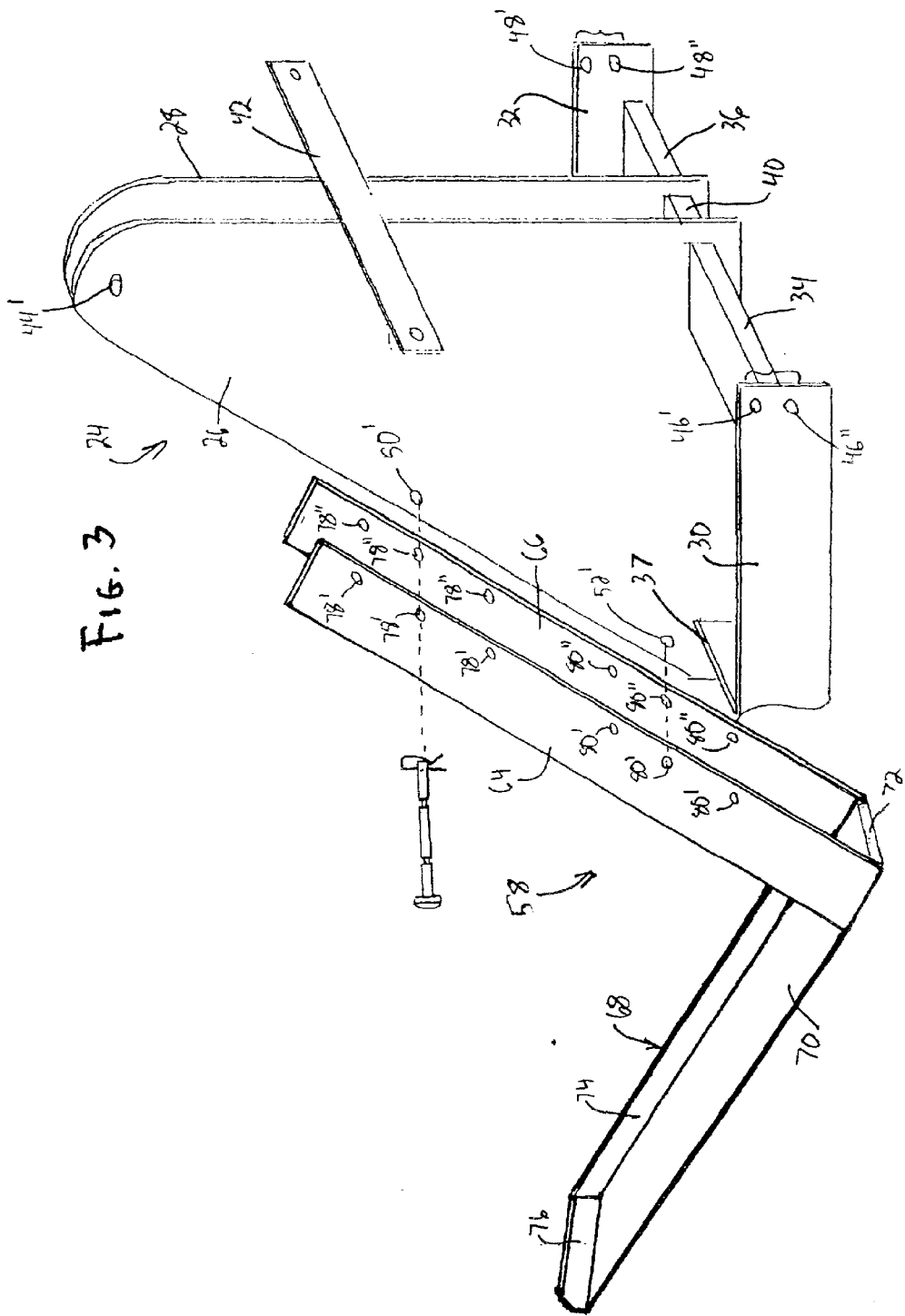

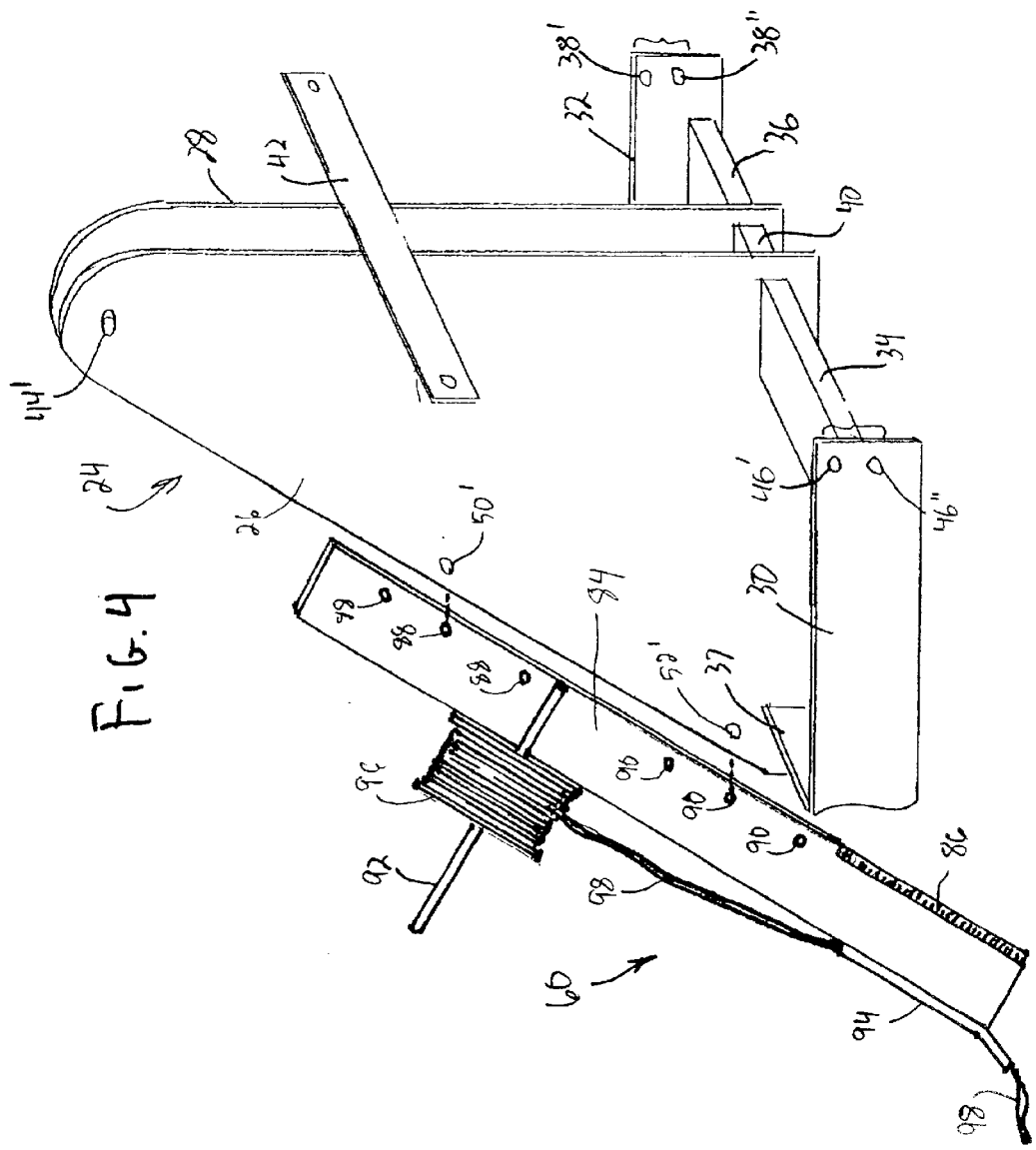

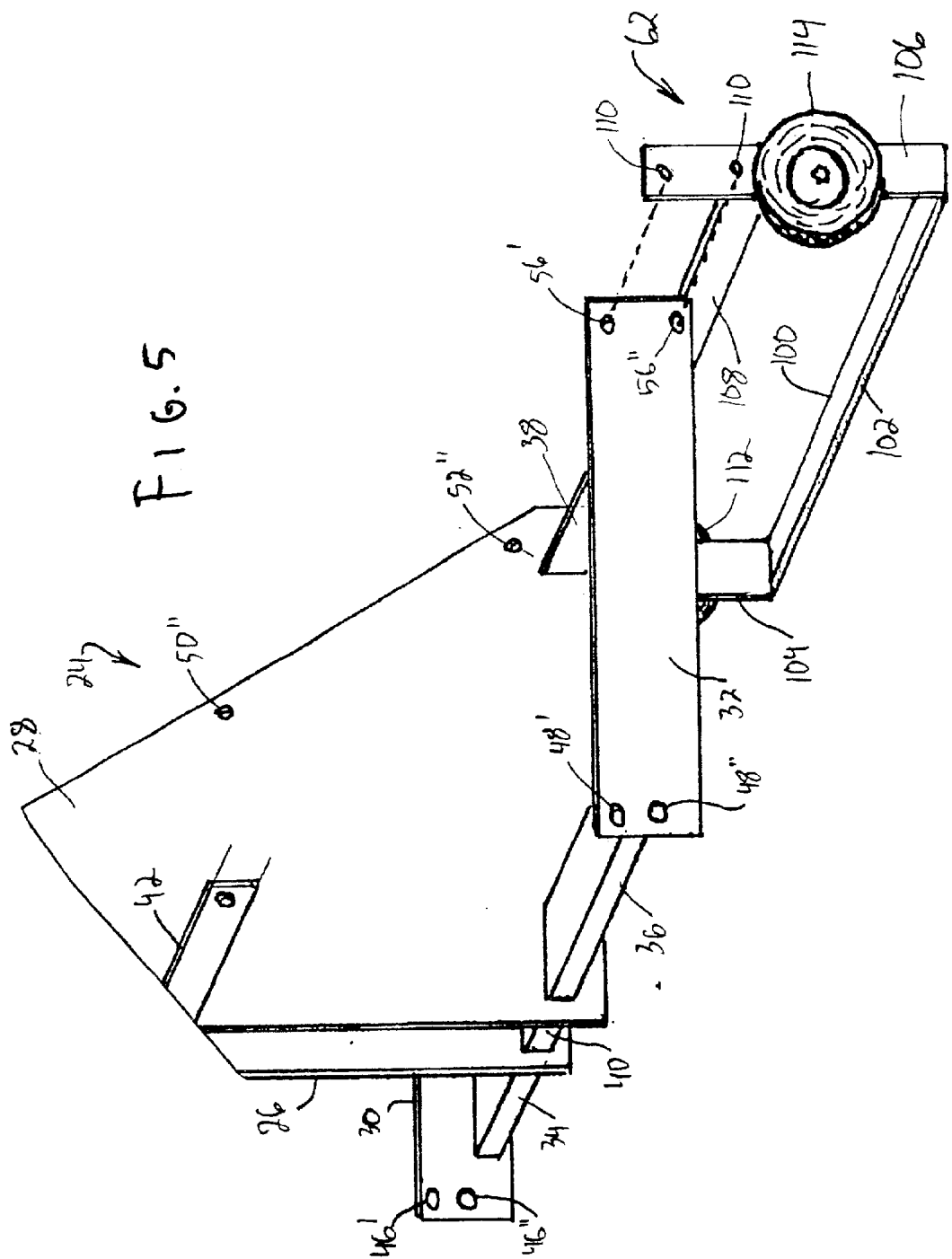

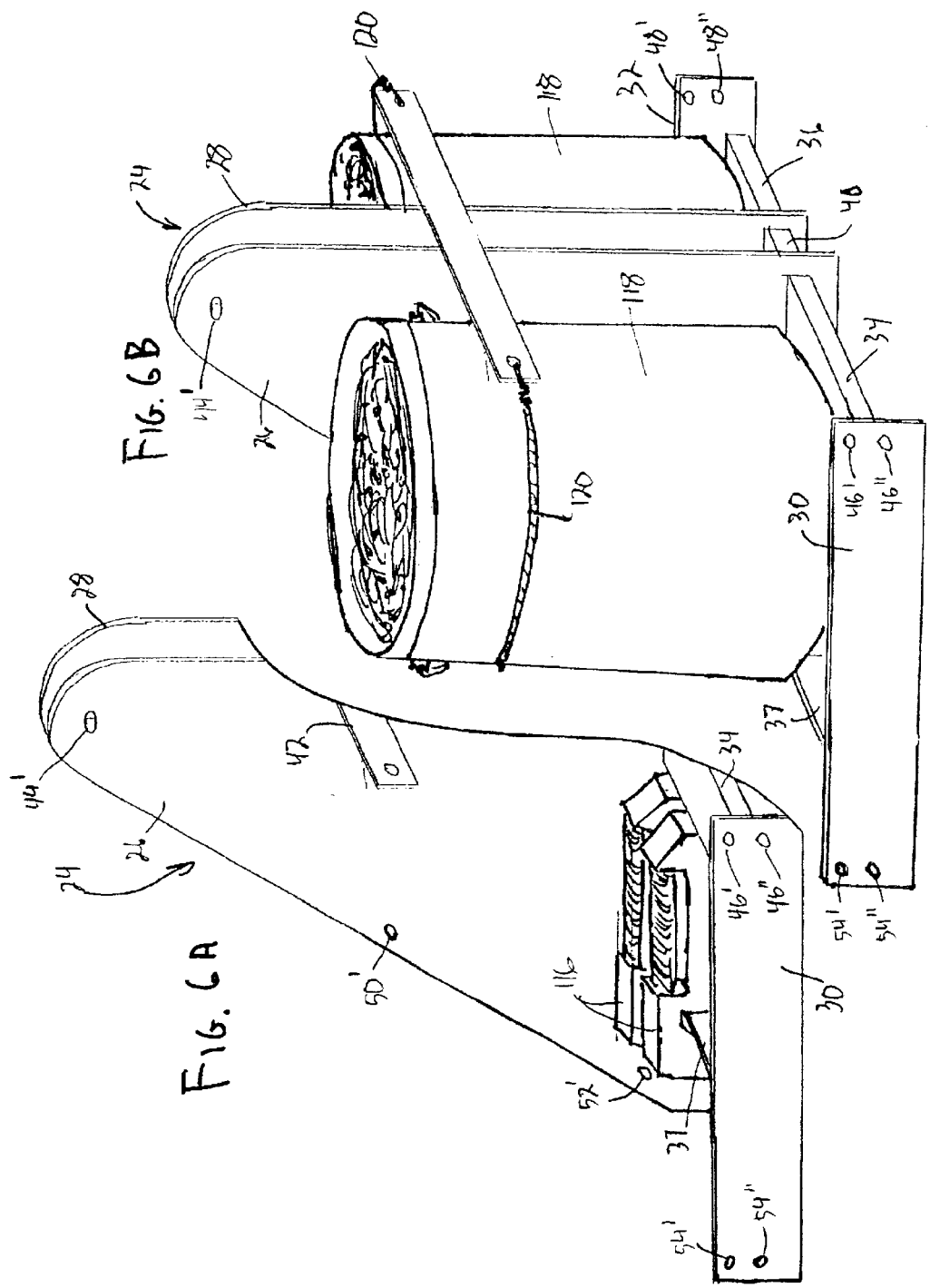

MULTI-FUNCTION IMPLEMENT FOR ATTACHMENT TO A TRACTOR AND THE LIKE

BACKGROUND OF THE INVENTION

This invention relates to earth working devices, and in particular to a multi-function implement for attachment to a tractor and the like which is adaptable to perform any number of earth-working tasks, such as cutting a trench, burying a cable or removing a swath of sod.

Machines are well-known for digging trenches, burying cables, or removing a swath of sod. Such machines, however, are uniquely usable only for a single function, such as digging a trench. That same machine is not adaptable for burying a cable or cutting a swath of sod for preparation of a path. Similarly, a machine formed for burying a cable is not adaptable to be used for trenching or removing of sod.

There is a need for a multi-function device which can individually perform a plurality of earth working functions, such as digging a trench, burying a cable or removing a swath of sod.

SUMMARY OF THE INVENTION

The invention is directed to a multi-function implement for attachment to a tractor and the like for performing a series of different earth working functions. The implement comprises a universal frame, the frame having a tractor attachment portion and tool attachment portion. A plurality of tools are individually connectable to the universal frame, each tool having a frame attachment portion which is complementary to the tool attachment portion of the universal frame. Means is provided for selectively connecting each tool the universal frame with the frame attachment portion of the tool joining the tool attachment portion of the universal frame.

In accordance with the preferred form of the invention, the tool attachment portion of the universal frame comprises an angled central connection member and an opposite connection wing on each side of the central connection member. The central connection member comprises a pair of spaced plates, with the plates having a plurality of aligned tool attachment apertures. In accordance with the preferred form of the invention, the spaced plates are parallel and substantially triangular in configuration. Each of the opposite connection wings comprises a horizontally-extending, vertically-oriented, plate spaced from the central connection member, each of the horizontally-extending plates having at least one tool attachment aperture.

In accordance with the preferred form of the invention, the universal frame also includes means for accommodating weight added to the universal frame. That weight can be specialized weights, or additional sources of weight such as concrete weights added atop the universal frame.

Each of the tools is selectively connected to the universal frame with a plurality of removable pins. Preferably, at least some of the pins are shear pins which can fracture should force exerted on the implement be too great.

One of the tools connectable to the universal frame comprises a trench excavator. The frame attachment portion of the trench excavator comprises a pair of spaced arms. The arms include a plurality of aligned attachment apertures. A trench member is secured at one end of the arms, and preferably comprises a flat earth guide secured between the arms with the guide having a blade for cutting into the earth. The guide also has means for expelling earth from the guide so that an earth "plug" can be neatly laid adjacent a trench for easy return to fill the trench when the trenching operation is completed.

Another of the tools individually connectable to the universal frame comprises a cable layer. The cable layer comprises an elongated plate having a blade at one end, and the frame attachment portion of the cable layer comprises an opposite end of the elongated plate having a plurality of attachment apertures. A cable reel spindle is secured to the elongated plate, and at least one guide is provided for facilitating in-ground insertion of cable proximate the blade.

Another of the tools individually connectable to the universal frame comprises a sod cutter. The sod cutter comprises a horizontal blade having upright supports at each end of the blade. The frame attachment portion of the sod cutter comprises upper ends of the upright supports, each having at least one attachment aperture. A wheel is mounted on each upright support for determining a maximum depth of penetration of the horizontal blade.

BRIEF DESCRIPTION OF THE DRAWINGS

The invention is described in greater detail in the following description of examples embodying the best mode of the invention, taken in conjunction with drawing figures, in which:

FIG. 2 is a perspective illustration of the universal frame of the multi-function implement of the invention, FIG. 3 is a perspective view of the trench excavator tool of the invention shown in relation to the universal frame, FIG. 4 is a view similar to FIG. 3, but showing the cable layer tool of the invention in proximity to the universal frame, FIG. 5 is a partial perspective view of the universal frame, and showing how the sod cutter tool according to the invention is affixed to the universal frame, FIG. 6A is a partial perspective view of the universal frame, showing added weights attached thereto, and FIG. 6B is a second form of applying weight to the universal frame, where buckets of concrete or the like are seated on the frame.

DESCRIPTION OF EXAMPLES EMBODYING THE BEST MODE OF THE INVENTION

Figure 1:
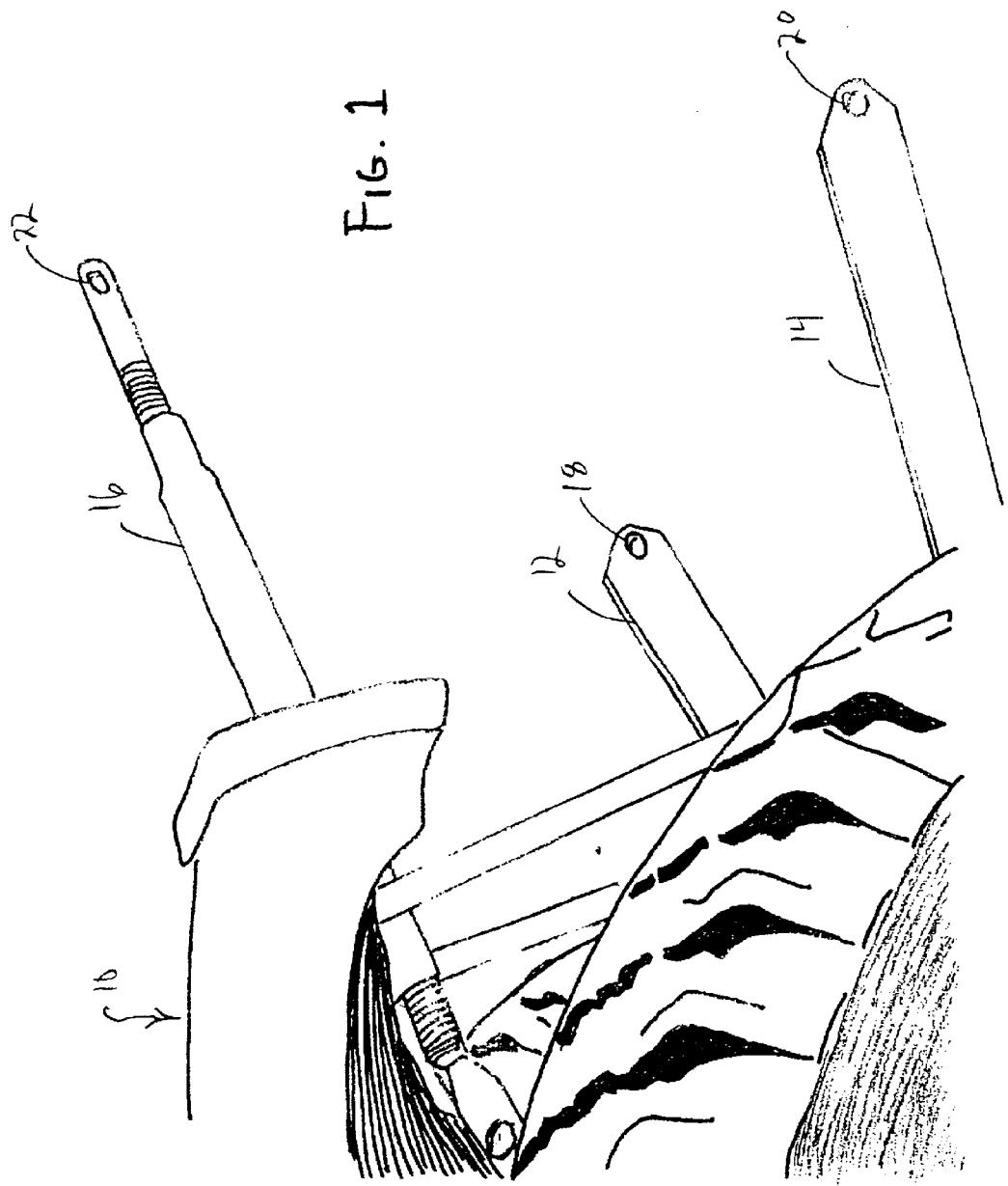
FIG. 1 is a partial perspective view, with portions cut away to show detail, of a typical three point hitch on a tractor compatible with the invention.

FIG. 1 illustrates, schematically, a portion of a tractor 10 having a three point category-1 three point hitch secured thereto in a conventional fashion. The three point hitch is composed of three arms, lower arms 12 and 14, and an upper arm 16. The nature of the three point hitch and its attachment to the tractor 10 is not part of the invention and both the tractor 10 and the three point hitch are conventional, and therefore not described in further detail. Furthermore, any vehicle or implement having a three point hitch or equivalent could be used, so the invention is not limited to use on just a tractor.

Each of the arms 12, 14 and 16 includes a respective connection aperture 18, 20 and 22. The connection apertures are used for connection to the universal frame of the multi-function implement according to the invention, which is described below in relation to FIGS. 2 through 6.

A preferred form of the universal frame according to the invention is shown generally at 24 in the drawing figures.

The universal frame 24 is preferably formed of steel parts that are welded or otherwise affixed to one another. The frame 24 includes an angled central connection member comprising a pair of spaced plates 26 and 28, which are parallel and generally triangular in configuration. Opposite connection wings 30 and 32 are located on each side of the spaced plates 26 and 28. The connection wings 30 and 32 are identical to one another, and comprise horizontally-extending, vertically-oriented plates spaced from their respective spaced plates 26 and 28 by appropriate connecting bars 34, 36, 37 and 38. The entire assembly of the universal frame 24 is symmetrical. Appropriate spacers 40 (only one illustrated) are located between the plates 26 and 28 to maintain proper parallel spacing of the plates 26 and 28.

A horizontal bar 42 is welded to each of the spaced plates 26 and 28 as shown. Not only does the horizontal bar 42 serve to maintain the spacing of the plates 26 and 28, but also it serves as an abutment and connection point for additional weight applied to the universal frame 24, as shown in FIG. 6B and described in greater detail below.

The plates 26 and 28 have opposite connection apertures 44' and 44". The wing 30 includes connection apertures 46' and 46", and the wing 32 includes connection apertures 48' and 48". The connection apertures 44 through 48 comprise a tractor attachment portion of the universal frame 24, and are appropriately secured to the three point hitch of the tractor 10 shown in FIG. 1. Pins, bolts or the like can be used for attachment, and as is known to one skilled in the art, the aperture 22 is secured between the connection apertures 44' and 44", the aperture 18 is connected to one of the apertures 46' and 46", and the aperture 20 is connected to one of the connection apertures 48' and 48". The particular means of connection is well-known to those skilled in the art and is therefore not shown or described in greater detail.

For connection of the various tools according to the invention as described in further detail below, the plates 26 and 28 have a series of opposite-aligned connection apertures 50', 50" and 52', 52". While only two pairs of such apertures are illustrated, any number of pairs of apertures can be provided, as required. Similarly, the wing 30 includes connection apertures 54' and 54", and the wing 32 includes connection apertures 56' and 56". The apertures 50 through 56 comprise a tool attachment portion of the universal frame 24 for appropriate attachment of the tools shown in FIGS. 3, 4 and 5.

There are three tools shown in the drawing figures and which are used in combination with the universal frame 24, although obviously any number of tools can be used, the three illustrated simply being preferred examples of tools according to the invention. The tools comprise, in order of appearance in the drawing figures, a trench excavator 58, a cable layer 60 and a sod cutter 62.

The trench excavator 58 is composed of a pair of spaced arms 64 and 66. A trench member 68 is appropriately secured between the arms 64 and 66 at one end, such as by welding. The trench member 68 is composed of a flat earth guide 70 having a blade 72 for cutting into the earth. For expelling earth from the guide as the trench excavator 58 is used, a side member 74 and an end member 76 are secured to the earth guide 70. Earth spills from the earth guide 70 over the open side thereof opposite the side member 74 as the trench excavator 58 is used.

The trench excavator 58 is secured to the universal frame 24, and includes an upper series of apertures 78' in the arm 64 and aligned apertures 78" in the arm 66. Similarly, the lower portion of each of the arms 64 and 66 include respective aligned apertures 80' and 80". The apertures 78 through 80 comprise a frame attachment portion of the trench excavator 58, and the apertures 78 through 80 are located so as to be complementary to the apertures 50 through 52 in the universal frame 24. A pair of pins 82, at least one of which is preferably a shear pin, is used for connecting the trench excavator 58 to the universal frame 24 in a conventional fashion, with the plates 24 and 26 sandwiched between the arms 64 and 66.

The cable layer 60 as shown in FIG. 2 comprises an elongated plate 84 having a blade 86 at a lower end thereof. The elongated plate 84 also has an upper series of attachment apertures 88 and a lower series of attachment apertures 90. The attachment apertures 88 and 90 comprise a frame attachment portion of the cable layer 60, and are formed to be aligned with the respective apertures 50', 50"and 52', 52". Pins such as the pins 82 are used for connection of the cable layer 60 to the universal frame 24, with the elongated plate 84 sandwiched between the spaced plates 26 and 28.

A cable reel spindle 92 is secured to the elongated plate 84 as shown in FIG. 4. At least one guide 94 is secured to the elongated plate 84 proximate the blade 86, the guide 94 comprising a tubular member for guiding cable therethrough as the cable is being buried. Other guides can be provided along the length of the elongated plate 84 as appropriate and depending on the length of the elongated plate 84.

For laying a length of cable, a spool of cable 96 is mounted on the cable reel spindle 92. Cable 98 is extracted from the spool 96 and fed through the guide 94, emerging beneath the bottom of the elongated plate 94. The term "cable" as used is intended to mean any type of cable, wire or small hose that can be accommodated and laid by the cable layer 60.

The sod cutter 62 is shown in FIG. 5, and comprises a horizontal blade 100 having a sod slicing portion 102. Secured at opposite ends of the blade 100 are upright supports 104 and 106. A crossbar 108 provides rigidity to the sod cutter 62. Each of the supports 104 and 106 includes a pair of attachment apertures 110 which, when the sod cutter 62 is mounted on the universal frame 24, are aligned with the respective connection apertures 54 through 56. The apertures 110 in the upright supports 104, 106 comprise the frame attachment portion of the sod cutter 62, and appropriate bolts, pins, shear pins or other means of connection can be used for mounting the sod cutter 62 on the universal frame 24 in a conventional fashion.

A pair of wheels 112 and 114 are mounted on the respective upright supports 104 and 106. The wheels 112, 114 determine the maximum depth of penetration of the sod cutter 62 when it is used.

Depending on the nature of the tractor 10 and its three point hitch, sufficient force may be applied to the tool (trench excavator 58, cable layer 60 or sod cutter 62) being used without any additional weight being applied to the universal frame. However, if additional weight is needed, conventional tractor weights 116 can be used, seated on the various connecting bars 34 through 38, as shown in FIG. 6A. Alternatively, as shown in FIG. 6B, additional weights, in the form of buckets 118 filled with concrete, sand or the like can be seated on the connecting bars 34 through 38. Bungee cords 120, or any other appropriate means, can be used to retain the buckets 118 in place.

The tools 58 through 62 are used individually on the universal 24. Turning first to the trench excavator 58, once it is secured to the universal frame 24, the three point hitch (comprising the arms 12 through 16) of the tractor 10 is used in a conventional fashion to raise or lower the trench excavator 58 to a proper elevation in relation to the ground. The tractor 10 is then driven in the forward direction, and the trench excavator 58 will excavate a trench, with the excavated material falling to one side as the tractor is driven. The depth of the trench is dictated by both the adjustment of the three point hitch as well as the elevation of attachment of the trench excavator 58 to the universal frame 24, using the apertures 78 through 80. Once a trench has been formed, the excavated material, which falls adjacent to the trench, can easily be returned when filling of the trench is desired.

The cable layer 60 is secured to the universal frame 24 through the apertures 88 and 90. The three point hitch of the tractor 10 is then lowered, with the blade end of the elongated plate 84 penetrating the earth. The free end of the cable 98 is initially retained, such as by holding it or tying it to a stake and the tractor 10 is then driven in the forward direction. The cable 98 unwinds from the spool 96 and is buried in a slit trench formed by the blade 86. Following laying of the cable 98, the slit trench, to the extent that it remains open at all, can be tapped in place by foot or by running the wheels of the tractor 10 over the thus-formed slit.

The sod cutter 62 is attached to the opposite wings 30 and 32, and the three point hitch of the tractor 10 is then lowered as the tractor 10 is driven in the forward direction. The blade 100 penetrates the earth, cutting a swath of sod (or whatever the earth surface may be), which can then be easily removed. The depth of the path cut by the sod cutter 62 is determined by the adjustment of the three point hitch of the tractor 10, with the maximum depth being determined by the elevation of the wheels 114 in relation to the blade 100.

Although three different tools comprise the preferred form of the invention, it will be evident to one skilled in the art that other tools can be devised and used with the universal frame 24. Various changes can be made to the invention without departing from the spirit thereof or scope of the following claims.

What is claimed is:

1. A multi-function implement for attachment to an earth-working vehicle comprising
   a. a universal frame, said universal frame having a vehicle attachment portion and a tool attachment portion,
   b. a plurality of tools individually connectable to said universal frame, each tool having a frame attachment portion complementary to said tool attachment portion, one of said tools comprising a trench excavator,
   c. means for selectively connecting each tool to said universal frame with said frame attachment portion joining paid tool attachment portion, and
   d. in which said frame attachment portion of said trench excavator comprises a pair of spaced arms, a trench member being secured at one end of said arms and trench member comprising a flat earth guide secured between said arms, said guide having a blade for cutting into the earth.

2. The multi-function implement according to claim 1, in which said tool attachment portion comprises an angled central connection member and an opposite connection wing on each side of said central connection member.

3. The multi-function implement according to claim 2, in which said central connection member comprises a pair of spaced plates, said plates having a plurality of aligned tool attachment apertures.

4. The multi-function implement according to claim 3, in which said plates are triangular.

5. The multi-function implement according to claim 2, in which each connection wing comprises a horizontal-extending plate spaced from said central connection member, each horizontally-extending plate having at least one tool attachment aperture.

6. The multi-function implement according to claim 1, in which said universal frame includes means for accommodating weight added to said universal frame.

7. The multi-function implement according to claim 1, in which said selective connecting means includes a plurality of removable pins.

8. The multi-function implement according to claim 7, in which at least some of said pins are shear pins.

9. The multi-function implement according to claim 1, in which said arms include a plurality of aligned attachment apertures.

10. The multi-function implement according to claim 1, including means for expelling earth from said guide. means for expelling earth said guide.

11. A multi-function implement for attachment to an earth-working vehicle comprising
   a. universal frame, said universal frame having a vehicle attachment portion and a tool attachment portion,
   b. a plurality of tools individually connectable to maid universal frame, each tool having a frame attachment portion complementary to said tool attachment portion,
   c. means for selectively connecting each tool to said universal frame with said frame attachment portion joining said tool attachment portion,
   d. and in which said tool attachment portion comprises an angled central connection member and an opposite connection wing on each side of said central connection member, said central connection member comprising a pair of spaced plates, said plates having a plurality of aligned tool attachment apertures, said plates being triangular.

* * * * *